US007209980B2

(12) United States Patent
Wugofski et al.

(10) Patent No.: US 7,209,980 B2
(45) Date of Patent: Apr. 24, 2007

(54) METHOD AND SYSTEM FOR INTERPRETING DEVICE CONTROL COMMANDS

(75) Inventors: Theodore David Wugofski, Forth Worth, TX (US); Gary Sullivan, Mansfield, TX (US); Chris Crawford, Fort Worth, TX (US)

(73) Assignee: Gateway Inc., Irvine, CA (US)

( * ) Notice: Subject to any disclaimer, the term of this patent is extended or adjusted under 35 U.S.C. 154(b) by 338 days.

(21) Appl. No.: 10/393,456

(22) Filed: Mar. 19, 2003

(65) Prior Publication Data

US 2003/0182474 A1 Sep. 25, 2003

Related U.S. Application Data

(63) Continuation of application No. 09/466,033, filed on Dec. 17, 1999, now abandoned.

(51) Int. Cl.
*G06F 3/00* (2006.01)
*G06F 13/12* (2006.01)
*G06F 15/18* (2006.01)

(52) U.S. Cl. .............................. 710/5; 710/62; 710/72; 707/1

(58) Field of Classification Search .................... 710/1, 710/5, 8, 65, 4, 33, 36, 62, 72; 707/1
See application file for complete search history.

(56) References Cited

U.S. PATENT DOCUMENTS

| 5,038,277 | A | * | 8/1991 | Altman et al. ................ 710/56 |
| 5,081,534 | A | | 1/1992 | Geiger et al. ................ 358/194 |
| 5,109,482 | A | | 4/1992 | Bohrman .................... 395/154 |
| 5,132,679 | A | | 7/1992 | Kubo et al. ............ 340/825.22 |
| 5,202,961 | A | | 4/1993 | Mills et al. ................. 395/159 |
| 5,396,546 | A | | 3/1995 | Remillard .................... 379/96 |
| 5,402,419 | A | * | 3/1995 | Osakabe et al. ............ 370/392 |
| 5,473,317 | A | | 12/1995 | Inomata et al. ........ 340/825.25 |
| 5,475,835 | A | | 12/1995 | Hickey ........................ 395/600 |
| 5,519,457 | A | | 5/1996 | Nishigaki et al. ........... 348/734 |
| 5,570,085 | A | | 10/1996 | Bertsch ................. 340/825.07 |
| 5,600,310 | A | | 2/1997 | Whipple, III et al. .. 340/825.06 |
| 5,627,978 | A | | 5/1997 | Altom et al. ................ 395/330 |
| 5,631,652 | A | | 5/1997 | Lee ............................ 341/176 |
| 5,673,401 | A | | 9/1997 | Volk ........................... 395/327 |

(Continued)

OTHER PUBLICATIONS

Grundig, A, "Eight Consumer Electronics Companies Release Home Audio/Video Interoperablitiy (HAVi) Core Specification for Networking Digital AV Appliances", http://www.sharp.co.jp/sc/gaiyou/news-e/9803.htm, (May 14, 1998), 1-3.

(Continued)

*Primary Examiner*—Kim Huynh
*Assistant Examiner*—Alan S. Chen
(74) *Attorney, Agent, or Firm*—Jeffrey A. Proehl; Woods Fuller Shultz & Smith (57) ABSTRACT

A multimedia system includes an information handling system, and a plurality of multimedia devices operatively and electrically connected to a computer of the system. Software modules residing in computer memory interpret control commands. This includes receiving a high level device control command, generating a generic device control script based on a device interconnect model and the high level device control command, interpreting the generic device control script, and transmitting specific device control commands to a device through a device interface.

25 Claims, 10 Drawing Sheets

U.S. PATENT DOCUMENTS

| | | | | |
|---|---|---|---|---|
| 5,675,753 | A | | 10/1997 | Hansen ........................ 395/333 |
| 5,692,205 | A | | 11/1997 | Berry ......................... 395/788 |
| 5,694,562 | A | | 12/1997 | Fisher ........................ 395/349 |
| 5,699,359 | A | * | 12/1997 | Suga ..................... 370/395.64 |
| 5,706,290 | A | * | 1/1998 | Shaw et al. ................. 370/465 |
| 5,710,712 | A | | 1/1998 | Labun ........................ 364/492 |
| 5,745,767 | A | | 4/1998 | Rosen et al. ................ 395/704 |
| 5,774,187 | A | | 6/1998 | Tsunoda ..................... 348/553 |
| 5,774,528 | A | | 6/1998 | Bogner et al. ......... 379/106.01 |
| 5,787,259 | A | * | 7/1998 | Haroun et al. .............. 709/253 |
| 6,032,202 | A | * | 2/2000 | Lea et al. ....................... 710/8 |
| 6,047,361 | A | * | 4/2000 | Ingenio et al. .............. 711/167 |
| 6,094,528 | A | * | 7/2000 | Jordan ........................ 717/115 |
| 6,158,010 | A | * | 12/2000 | Moriconi et al. .............. 726/1 |
| 6,275,866 | B1 | * | 8/2001 | Boulia et al. ............... 719/315 |
| 6,667,992 | B1 | * | 12/2003 | Yanagawa ................... 370/490 |
| 6,781,518 | B1 | * | 8/2004 | Hayes et al. ........... 340/825.72 |
| 2002/0174270 | A1 | * | 11/2002 | Stecyk et al. .................... 710/1 |

OTHER PUBLICATIONS

Yoshida, Junko, "Home Networks Grab Attention In the Digital Home", http://www.eet.com/news/98/1016news/home.html,(Jul. 2, 1998), 1-6.

* cited by examiner

METHOD AND SYSTEM FOR INTERPRETING DEVICE CONTROL COMMANDS

RELATED APPLICATION

This application is a continuation under 37 CFR 1.53(b) of U.S. application Ser. No. 09/466,033 filed Dec. 17, 1999, now abandoned which application is incorporated herein by reference.

FIELD OF THE INVENTION

The present invention is generally directed to multimedia systems and, more specifically, to methods and apparatus for interpreting control commands for any device in a multimedia system.

BACKGROUND OF THE INVENTION

A multimedia system is a system linking multiple types of media devices. Such a system may be used in the home, at school, for business presentations, or the like. One example of a multimedia system is the Gateway® Destination® xtv 500. It links an information handling system or personal computer (PC), internet access, cable television, video system, audio system, digital versatile disc read-only memory (DVD-ROM), compact disc read-only memory (CD-ROM), as well as other accessories and peripherals. Destination® xtv 500 users have a central command center for multimedia activities, such as playing computer games, surfing the internet, watching cable or DVD movies or videos, working on a PC, listening to CDs, and the like.

Multimedia systems link different media devices. These linked devices form subsystems within the system. The multimedia system folds these subsystems into one system with a central control center and a single user interface. However, there are several problems associated with this linking process. First, the devices do not necessarily have consistent user interfaces, nor consistent communication interfaces, due in part to the fact that they often have different manufacturers. Second, most users of multimedia systems do not have experience with the complex technologies incorporated into such a system. Furthermore, a user may not understand how the devices are interconnected, or how each device is controlled. Finally, a user interface that is convenient for designers to implement is not necessarily adapted to suit the needs of the user. A user interface that is convenient for designers to implement is one made up of internal actions and devices familiar to the designer, rather than one made up of actions and devices familiar to the user. High level commands describe actions and objects familiar to the user, which need to be interpreted or translated into internal actions and devices in the multimedia system.

SUMMARY OF THE INVENTION

The present method and system for interpreting device control commands in a preferred embodiment is an information handling system or computer comprising a number of multimedia devices operatively and electrically connected to the computer, and at least one software module residing in computer memory. The software module includes a set of machine-readable instructions capable of enabling the computer to perform a method for interpreting device control commands.

The method for interpreting device control commands in a preferred embodiment includes receiving a high level device control command, generating a generic device control script based on a device interconnect model and the high level device control command received, interpreting the generic device control script, and transmitting specific device control commands to a specific device through a device interface.

DETAILED DESCRIPTION OF PREFERRED EMBODIMENTS

In the following detailed description of preferred embodiments, reference is made to the accompanying drawings which form a part hereof, and in which are shown by way of illustration, specific embodiments in which the invention may be practiced. These embodiments are described in sufficient detail to enable those skilled in the art to practice the invention, and it is to be understood that other embodiments may be utilized, and logical, structural, electrical, and/or other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the software arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is understood that throughout the present invention, discussions utilizing terms such as "processing" or "computing" or "calculating" or "determining" or "displaying" or the like, refer to the action and processes of an information handling system, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
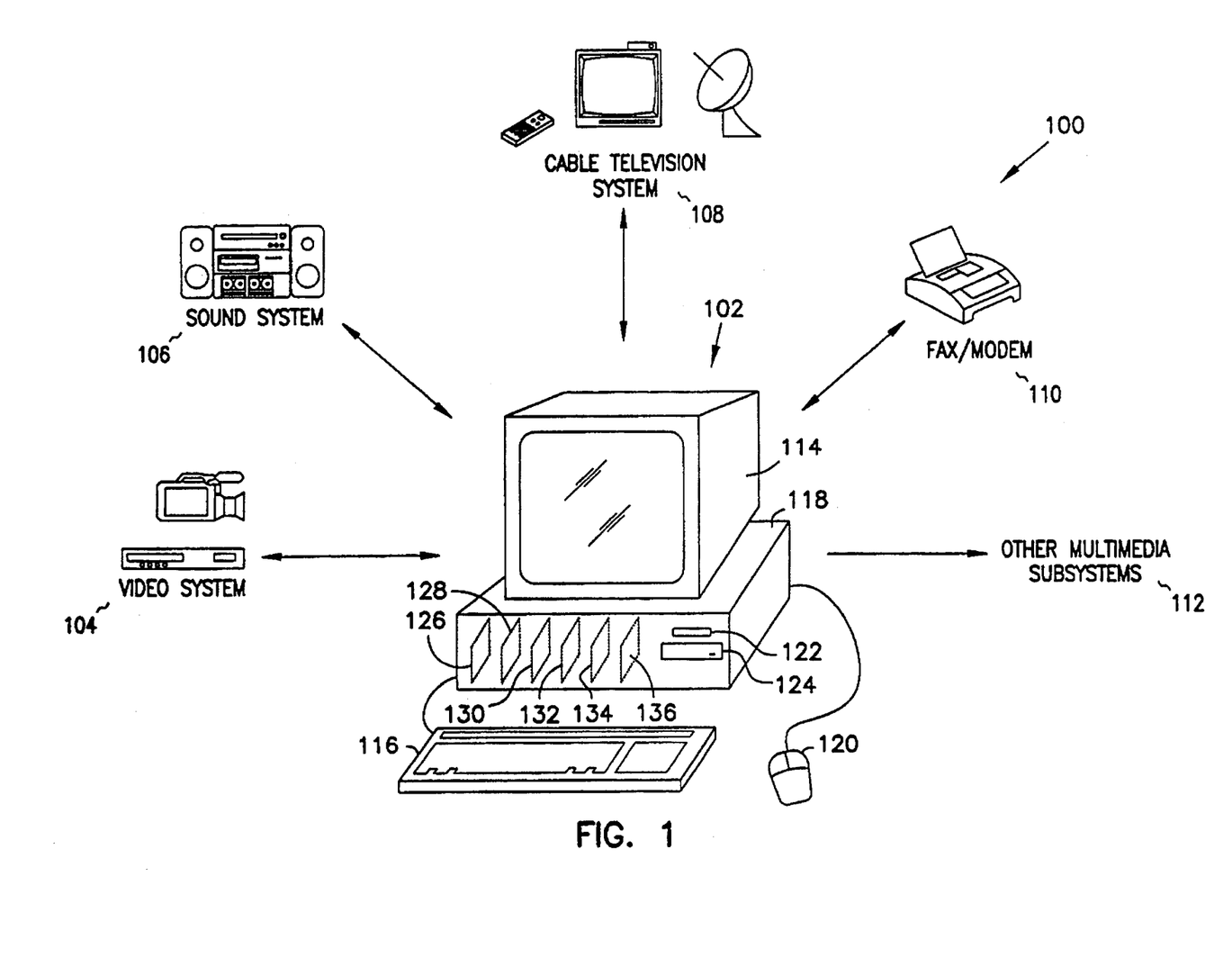
FIG. 1 is a perspective view of a preferred embodiment of an information handling system in communication with multimedia devices.

FIG. 1 is a perspective view of an information handling system or computer system embodiment of a multimedia system 100. The multimedia system links a personal computer 102, a video system 104, a sound system 106, a cable television system 108, a fax/modem 110, and other multimedia subsystems 112. Multimedia devices may vary in location, being in the personal computer or connected to it. For example, instead of being built into the personal computer, a CD-ROM drive could be separate from the personal computer, but linked to it. Personal computer 102 has a monitor 114, a keyboard 116, a central processing unit (CPU) 118 for running software application programs, a pointing device such as a mouse 120, a disk drive 122, and a CD-ROM drive 124. The monitor 114 displays a user interface for the multimedia system in this embodiment. The personal computer 102 also has a variety of software application programs installed in memory 126, including, for example, internet access, DVD-ROM and CD-ROM players, word processing, computer games, and various other application programs. Additionally, the personal computer 102 has the following stored in memory in a preferred embodiment: graphical user interface software 128 which creates a display on monitor 114 for controlling the multimedia system, a number of databases 130 containing information about internal subsystems of the multimedia system, a device interconnect model 132, software for running the multimedia system 134, and various multimedia drivers and communications software 136 to control multimedia devices and to transmit and receive information within the multimedia system. Thus, the embodiment of a multimedia system shown in FIG. 1 contains subsystems linked together with one user interface on the personal computer.

A first computer system embodiment of the present invention includes a computer, a number of multimedia devices operatively and electrically connected to the computer, and at least one software module residing in computer memory. The software module includes a set of machine-readable instructions that perform a method of interpreting device control commands. That method is described in detail below.

Another computer system embodiment of the present invention is a multimedia system including a computer, a number of multimedia devices operatively and electrically connected to the computer, at least one first software module and at least one second software module both residing in computer memory. The first software module includes a number of databases including an infrared command database, a 1394 command database, a vendor specific command database, a device, manufacturer, model, and interface database and other command data. The second software module includes a set of machine-readable instructions performing a method of interpreting device control commands. That method is described in detail below.

Figure 2:
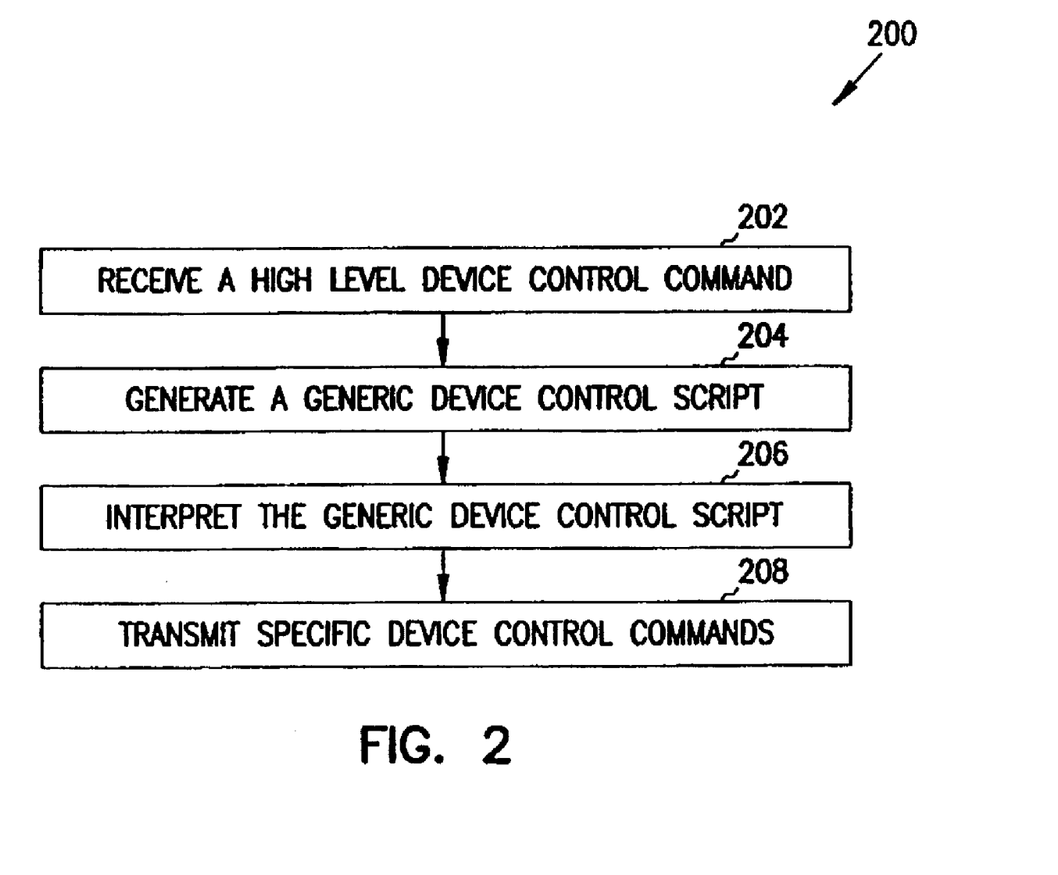
FIG. 2 is a flowchart diagram of a preferred embodiment of the present method for interpreting device control commands.

FIG. 2 is a flowchart of a preferred embodiment 200 of a method for interpreting device control commands including receiving a high level device control command in block 202, generating a generic device control script based on a device interconnect model and the high level device control command in block 204, interpreting the generic device control script in block 206, and transmitting specific device control commands to a specific device through a device interface in block 208. This is the basic process flow contained in the many alternative preferred embodiments described below.

In receiving a high level device control command as in block 202, a multimedia system gets a user request such as running a certain computer game selected from the user interface. A high level device control command is either a user request or a command generated by the system itself to control one of the multimedia devices in the system. For example, a user might seek to control a VCR by initiating a command such as "play." A high level device control command differs from a specific device control command in that the high level device control command is in terms familiar to the user while a specific device control command deals with the complex internal subsystem communications. An example of a specific device control command is sending an infrared signal to the VCR to start playing a video. Some examples of high level device control commands for a video system linked in a multimedia system are play, record, fast forward, reverse, eject and others. Examples of high level device control commands for a cable television system linked in a multimedia system include but are not limited to power on, power off, change the channel to a certain channel, go up one channel and similar commands. Examples of high level device control commands for an audio system linked in a multimedia system are power on, power off, volume increase, volume decrease, set station, play CD, play audio tape, and similar commands. The multimedia system itself may generate a command to, for example, begin recording a television program at a specified time on a specified channel based on a prior user request.

In generating a generic device control script based on a device interconnect model and the high level device control command as in block 204, the multimedia system creates a generic device control script corresponding to the high level device control command received in block 202. A generic device control script consists of control commands not yet tailored for a certain device in the system but rather based on how the devices are modeled in the device interconnect model. The multimedia system compares the high level device control command to the device interconnect model and creates a generic device control script. In order to create this script, the multimedia system consults a device interconnect model residing in memory on the personal computer in the multimedia system. A device interconnect model is a model of the multimedia devices in the system and how they are connected. A device interconnect model of the type utilized in embodiments of the present invention is disclosed in U.S. patent application Ser. No. 09/313,669, filed May 18, 1999, entitled METHOD AND SYSTEM FOR PERIPHERAL DEVICE USER INTERFACE CONSTRUCTION, which is assigned to assignee of the present application, and which is incorporated by reference in its entirety.

In interpreting the generic device control script as in block 206, the multimedia system tailors the generic device control script generated in block 204 for a specific device. The process of interpretation tailors the generic device control script to a specific device in the system by adding more internal subsystem technical detail not available to the user and not contained in the device interconnect model.

For example, the generic control script generated to play a video in the VCR may be interpreted so that specific infrared signals are created that would start a video playing. This tailoring results in specific device control commands that are then transmitted in block 208.

In transmitting specific device control commands to a device through a device interface, as in block 208, communication through device interfaces is the means by which multimedia devices are controlled by the system. A device interface may be an infrared transmitter, a 1394 driver, or another driver or interface. For example, infrared signals may be transmitted to start a video playing. The specific device control commands may be communicated to any device using an appropriate communications method. For example, if the user wants to watch a DVD movie and indicates this using the user interface, the multimedia system would ultimately send necessary signals to the DVD driver to play that DVD movie.

In addition, interpreting the generic device control script may be done, in part, by accessing a number of databases to interpret the generic device control script and create specific device control commands. The number of databases may include an infrared command database, a 1394 command database, a vendor specific command database, a device, manufacturer, model, and interface database and other command data. Each of these databases consist of a portion of memory in the personal computer in the multimedia system. An infrared command database contains information about the internal subsystem details for sending device control commands using the infrared transmitter. Likewise, the 1394 command database contains information about the internal subsystem details for sending device control commands using the 1394 driver. The vendor specific command database contains information about commands unique to a device made by a particular vendor in contrast to commands that are the same for a certain device no matter who the vendor is for that device. The device, manufacturer, model, and interface database contains detailed internal subsystem information that depends on the manufacturer, model, and interface data for each device. More detailed internal subsystem information may be stored in other command databases.

Figure 3:
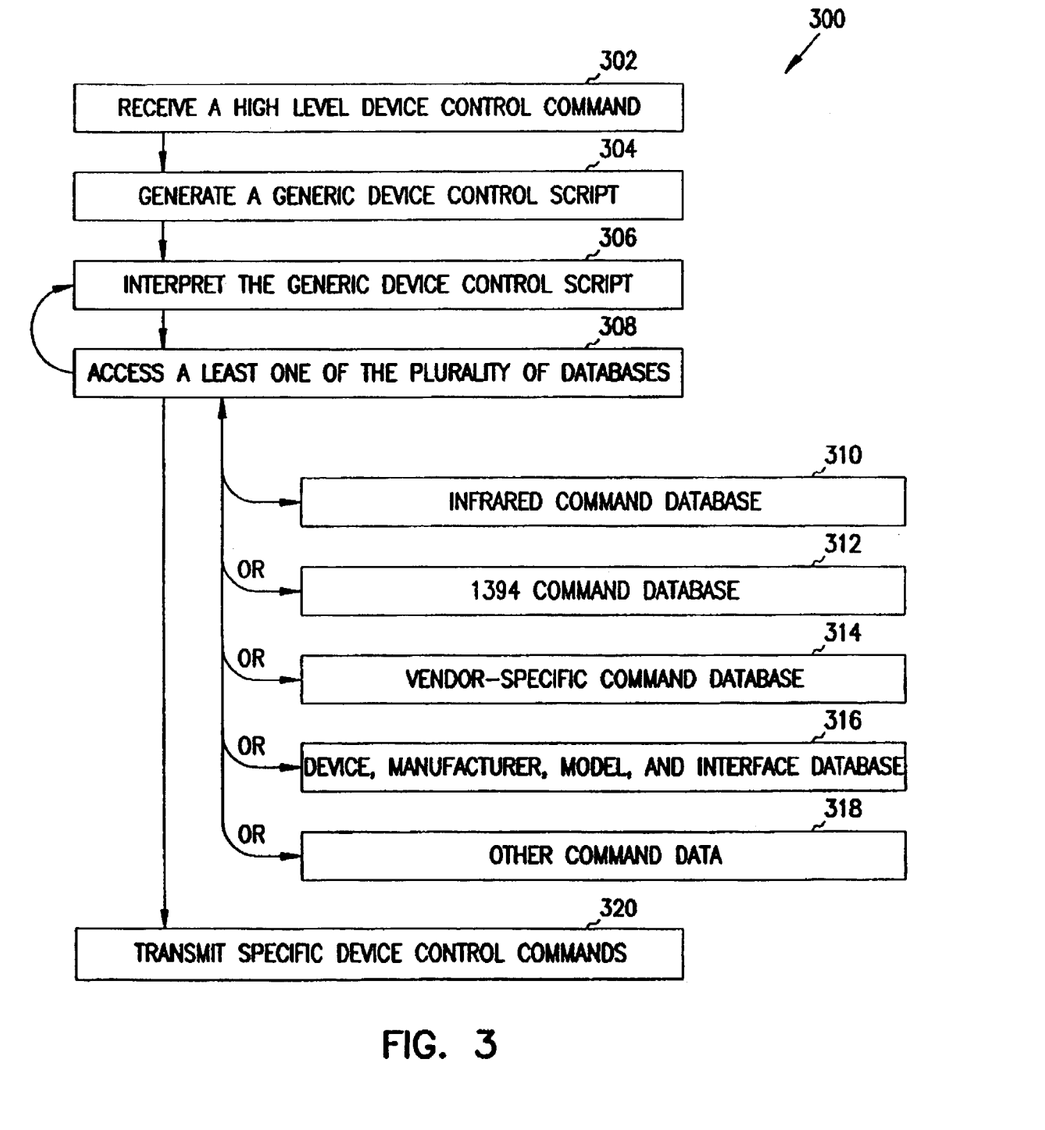
FIG. 3 is a flowchart diagram of an alternative embodiment of the present method for interpreting device control commands.

Alternative method embodiment 300 of the present invention is shown in FIG. 3. This method for interpreting device control commands has the same basic process flow in blocks 302, 304, 306, and 320 as embodiment 200 shown in FIG. 2. However, in the embodiment 300, in interpreting the generic device control script 306, the system accesses at least one of a number of databases in block 308. The number of databases includes, in an alternative embodiment, an infrared command database 310, a 1394 command database 312, a vendor-specific command database 314, a device, manufacturer, model, and interface database 316, or other command data 318. The interpretation block 308 in the alternative embodiment involves selecting and accessing one or more databases repeatedly while gathering the information to tailor the generic device control script and creating a specific device control script.

Figure 4:
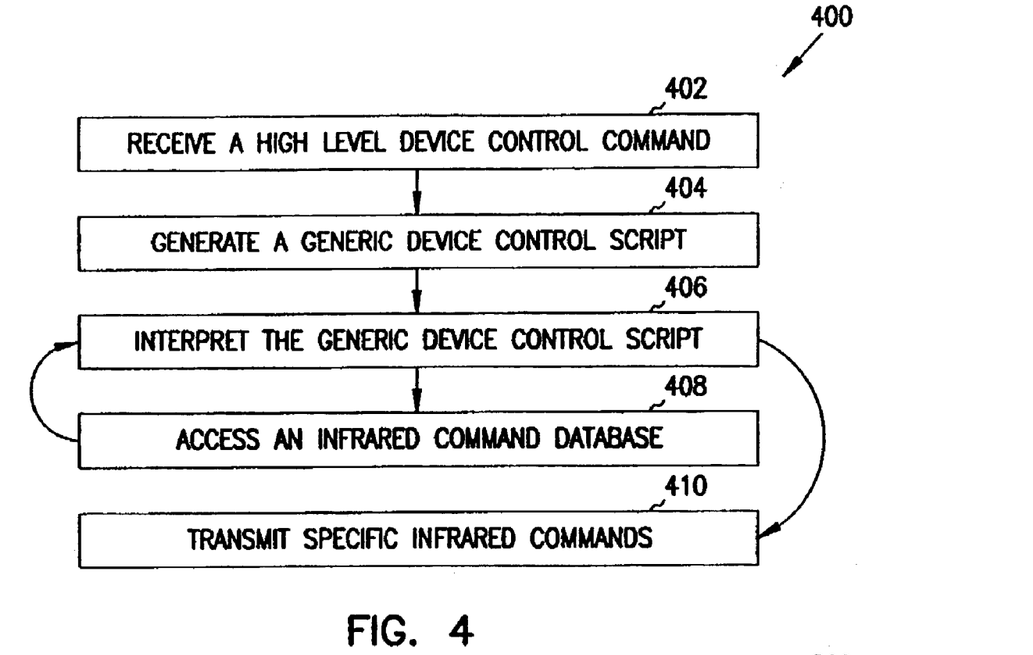
FIG. 4 is a flowchart diagram of alternative embodiment of the present method for interpreting device control commands.

Alternative embodiment 400 shown in FIG. 4 has the same basic process flow in blocks 402, 404, 406, and 410 as embodiment 200 in FIG. 2. However, in embodiment 400, only an infrared command database is accessed in block 408 and only infrared commands are transmitted in block 410. In this alternative embodiment, all the multimedia devices in the system are linked via infrared communications and each specific device control command is transmitted over the infrared driver.

Figure 5:
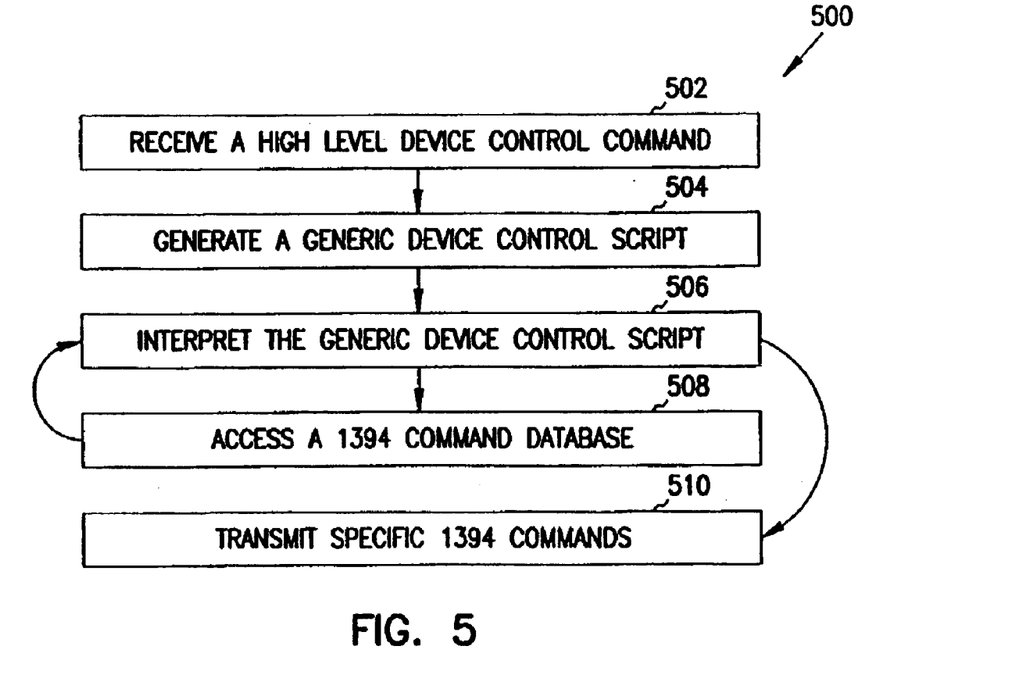
FIG. 5 is a flowchart diagram of alternative embodiment of the present method for interpreting device control commands.

In alternative embodiment 500 shown in FIG. 5, all the multimedia devices in the system are linked with a 1394 bus and each specific device control command is transmitted over the 1394 bus driver. IEEE 1394 is a fast external bus standard for high levels of real-time data transfer and a single 1394 port can be used to connect up many devices. This embodiment 500 has the same basic process flow in blocks 502, 504, 506, and 510 as embodiment 200 shown in FIG. 2. In addition, interpretation involves accessing a 1394 command database 508.

Figure 6:
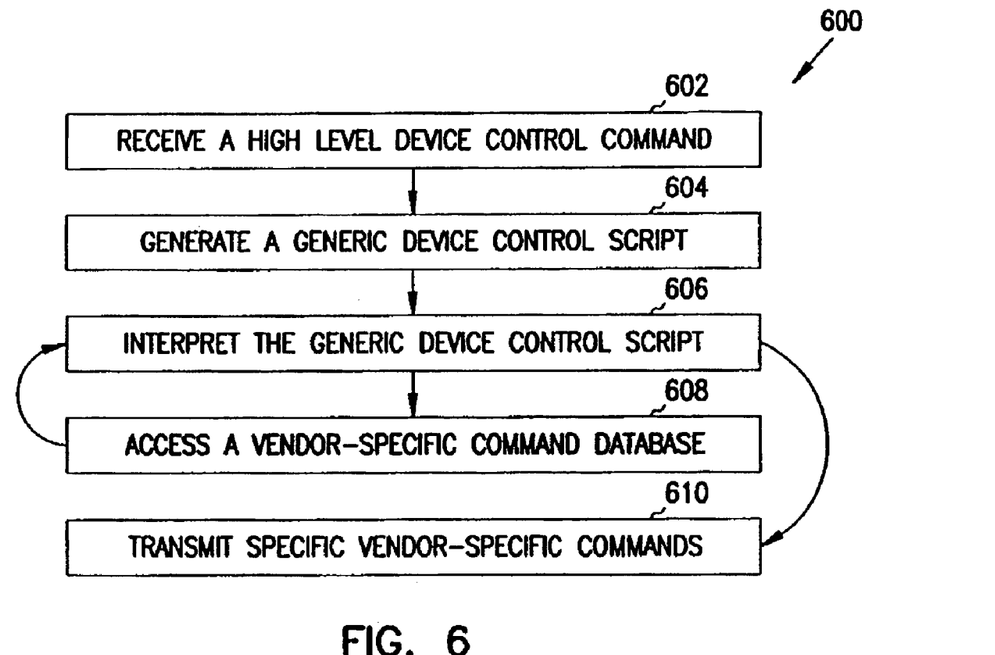
FIG. 6 is a flowchart diagram of alternative embodiment of the present method for interpreting device control commands.

In alternative embodiment 600 shown in FIG. 6, the communications to the multimedia devices in the system differ depending on the vendors who provided the devices. This embodiment has the same basic process flow in blocks 602, 604, 606, and 610 as embodiment 200 shown in FIG. 2. However, interpretation also includes accessing a vendor-specific command database 608 at least once while interpreting the script and creating the specific commands.

Figure 7:
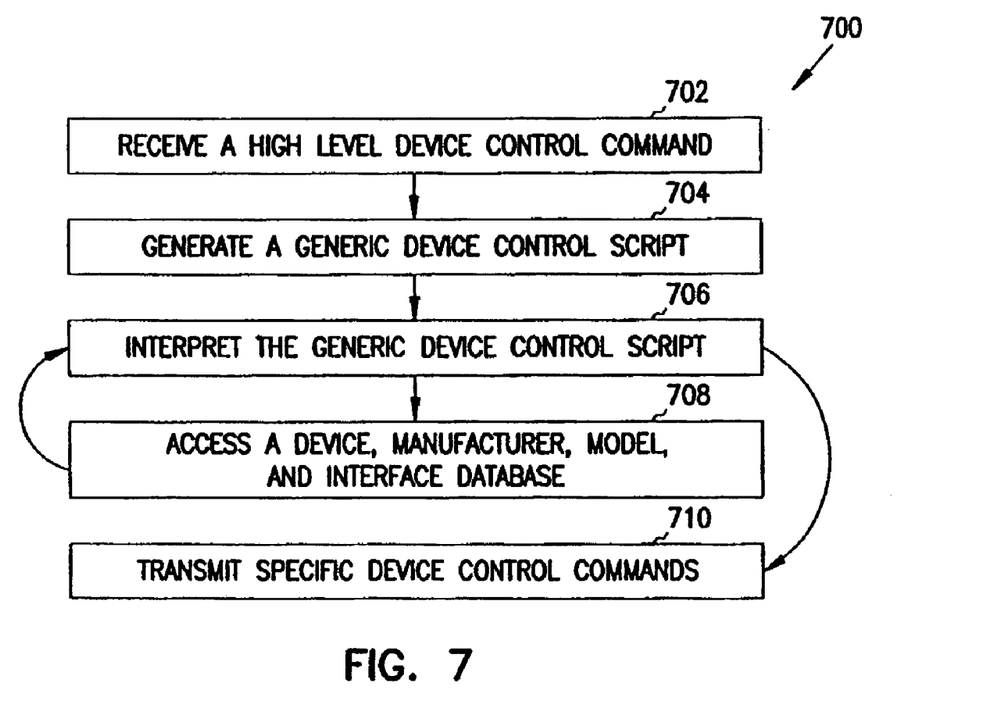
FIG. 7 is a flowchart diagram of alternative embodiment of the present method for interpreting device control commands.

If the communications to the multimedia devices in the system differ depending on the type of device, who manufactured the device, the model number of the device, and defined interfaces for that device, then the embodiment 700 shown in FIG. 7 is utilized. This embodiment also has the same basic process flow in blocks 702, 704, 706, and 710 as embodiment 200 shown in FIG. 2, and interpretation also includes accessing a device manufacturer, model, and interface database 708 at least once while interpreting the script and creating the specific commands.

Figure 8:
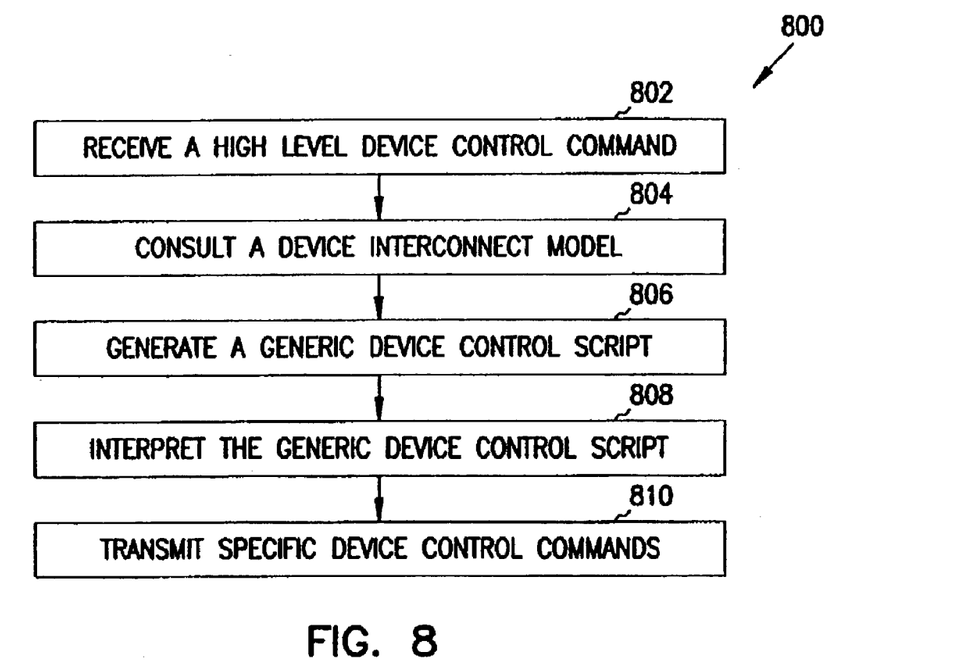
FIG. 8 is a flowchart diagram of alternative embodiment of the present method for interpreting device control commands.

The method embodiment 800 shown in FIG. 8 has the same basic process in blocks 802, 806, 808, and 810 as embodiment 200 shown in FIG. 2. Additionally, the process includes consulting a device interconnect model in block 804. A high level device control command is compared to information in the device interconnect model in order to generate a generic device control script.

Figure 9:
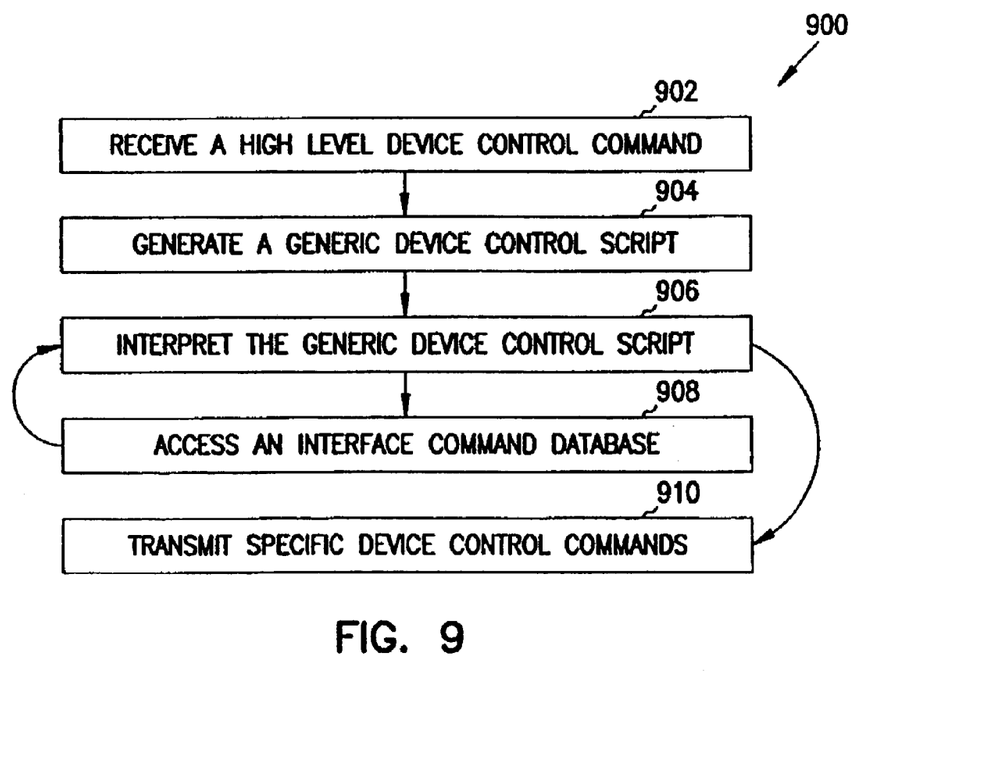
FIG. 9 is a flowchart diagram of alternative embodiment of the present method for interpreting device control commands.

In FIG. 9, alternative embodiment 900 has the same basic process flow in blocks 902, 904, 906, and 910 as embodiment 200 shown in FIG. 2. Here, interpretation involves accessing an interface command database 908 alone, while interpreting the generic script and creating the specific script.

Figure 10:
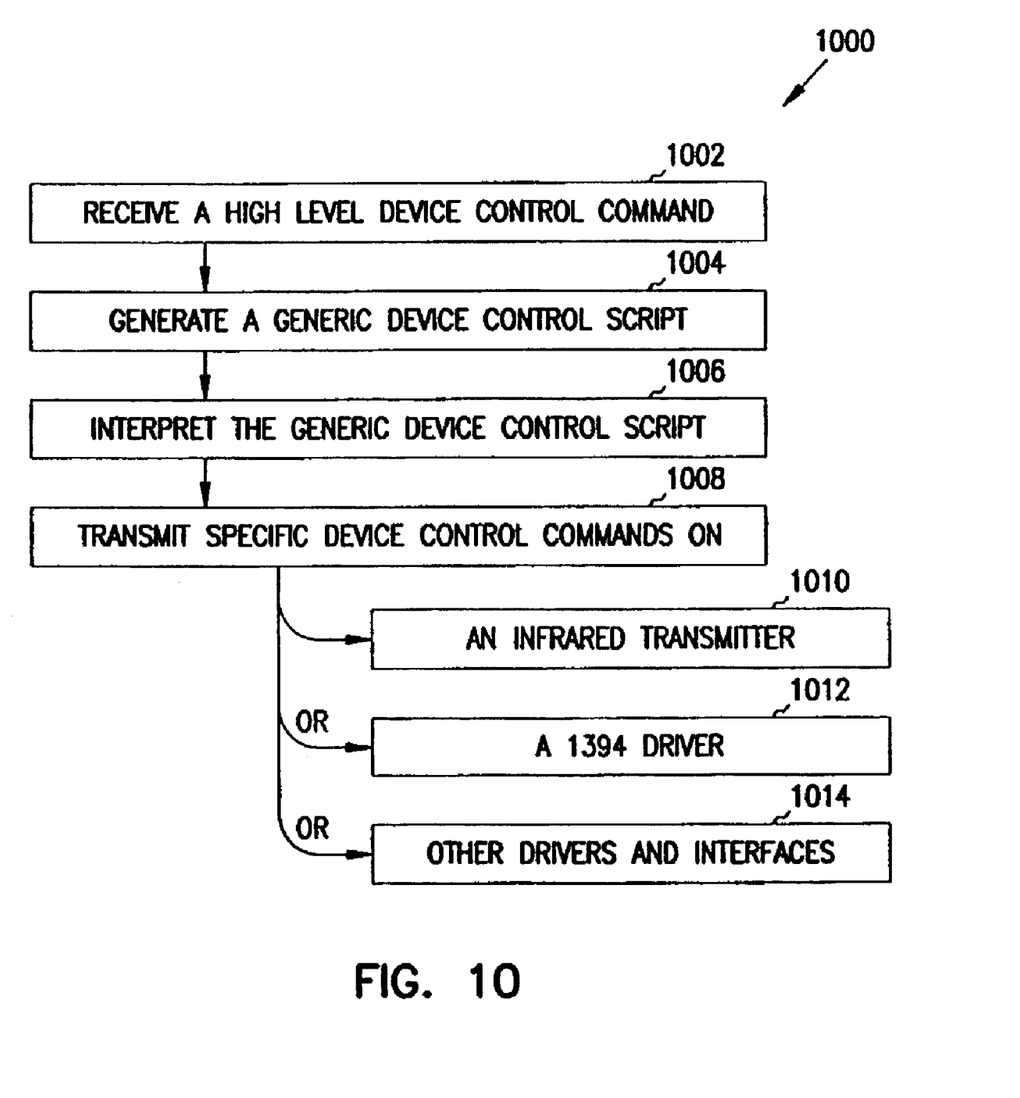
FIG. 10 is a flowchart diagram of alternative embodiment of the present method for interpreting device control commands.

FIG. 10 shows an embodiment 1000 of the method with the basic process flow in blocks 1002, 1004, 1006, and 1008 as embodiment 200 shown in FIG. 2. However, for transmission, the specific device control commands can be transmitted in various ways: using an infrared transmitter 1010, a 1394 driver 1012, or other drivers and interfaces 1014.

Figure 11:
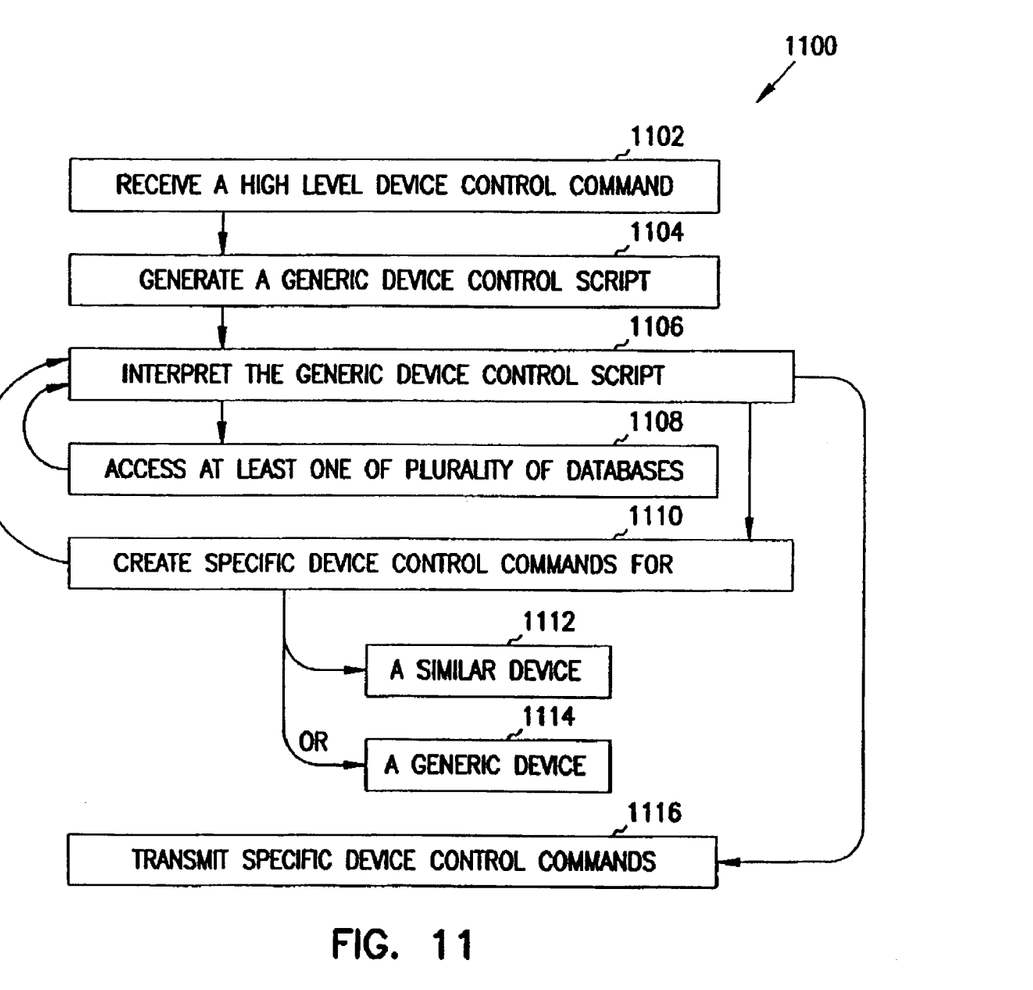
FIG. 11 is a flowchart diagram of alternative embodiment of the present method for interpreting device control commands.

Fault tolerance is provided in the embodiment 1100 shown in FIG. 11. Embodiment 1100 has the same basic process flow in blocks 1102, 1104, 1106, and 1116 as embodiment 200 shown in FIG. 2. However, interpreting the generic device control script includes further processing. While interpreting the generic device control script, the multimedia system accesses at least one of a number of databases 1108 and creates specific device control commands 1110 for a similar device 1112 or a generic device 1114. Whether commands for a similar device or generic device are created depends on the success in comparing the targeted device to the databases. When a device is not an exact match but shares some attributes to a device in at least one of the databases, then specific device control commands are created for a similar device. In contrast, when a device has no matches and no partial matches in the databases, then specific device control commands are created for a generic device.

In this way, embodiment 1100 allows for fault tolerance in interpreting the generic device control script. The generic device control script may be interpreted for a device that is not an exact match in at least one of the number of databases by creating specific device control commands for a similar device. A similar device is one that has some of the same attributes as the device the user wishes to control so that the specific device control commands are likely to be the same for both devices. Alternatively, the generic device control script may be interpreted for a device that is not in at least one of the number of databases by creating specific device control commands for a generic device. A generic device is a hypothetical device containing many of the attributes of multimedia devices commonly found in multimedia systems. This fault tolerance shields the user from having to deal with errors that might occur in a more rigid and fragile system.

Figure 12A:
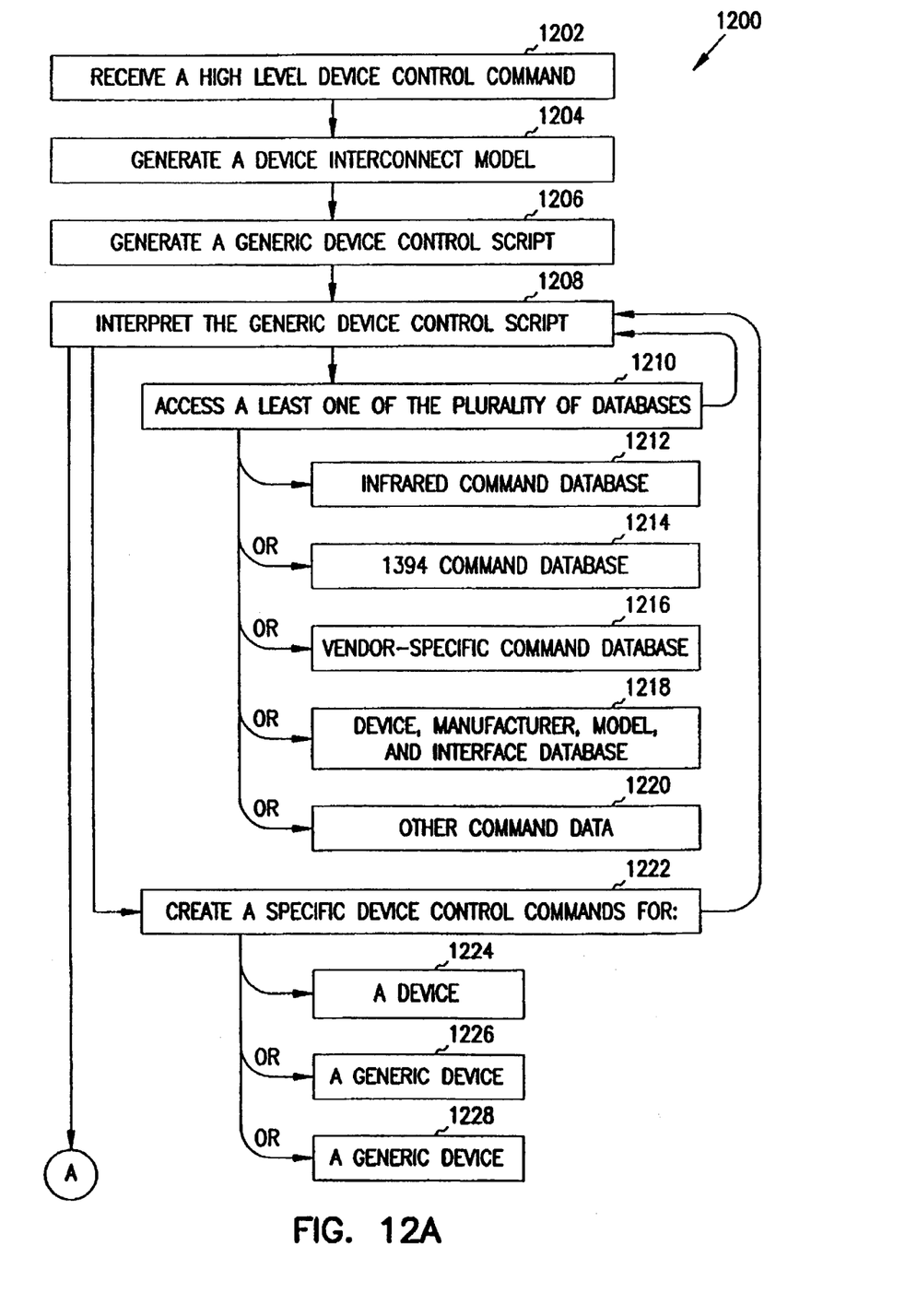
FIG. 12A is a flowchart diagram of alternative embodiment of the present method for interpreting device control commands.
Figure 12B:
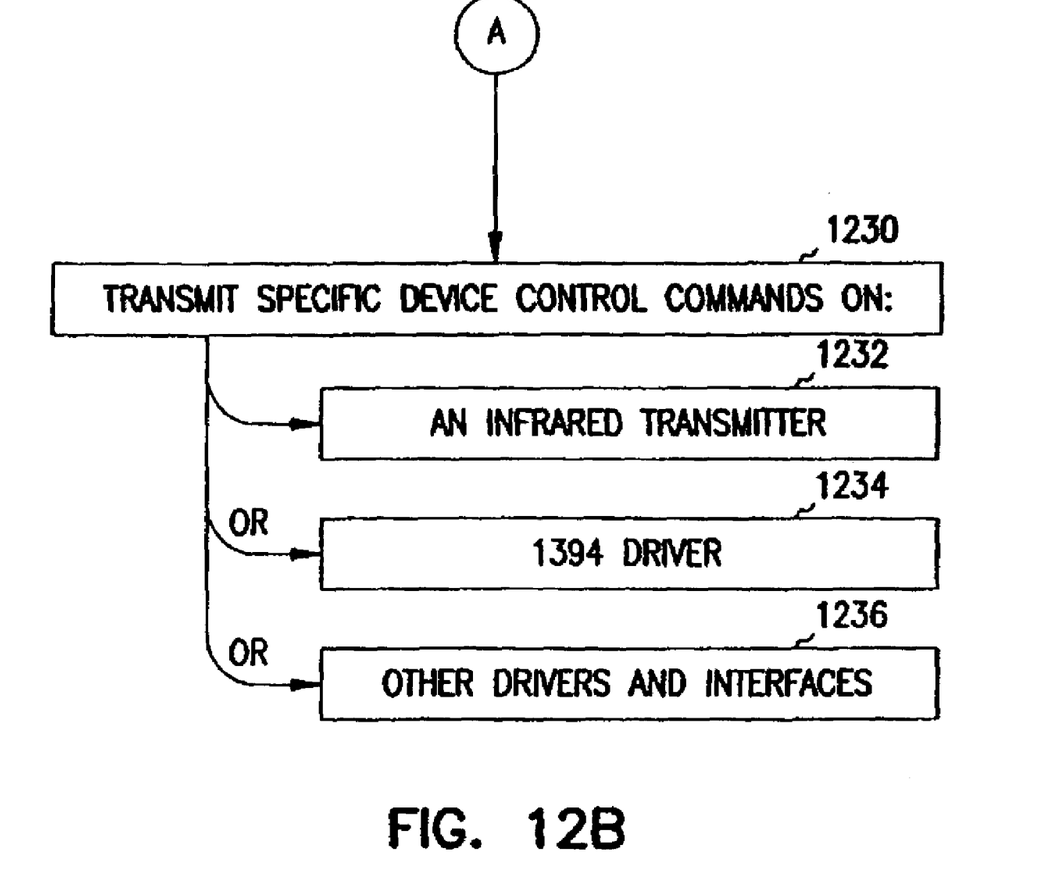
FIG. 12B is the remaining portion of the flowchart diagram of the alternative embodiment of FIG. 12A.

Alternative method embodiment 1200 is shown in FIGS. 12A & 12B. This method has the same basic process flow in blocks 1202, 1206, 1208, and 1230 as embodiment 200 shown in FIG. 2. Furthermore, it incorporates all of the additional features discussed above for method embodiments 300, 400, 500, 600, 700, 800, 900, 1000, and 1100 shown in FIGS. 3, 4, 5, 6, 7, 8, 9, 10, and 11 respectively.

In addition to the method and system embodiments described above, alternative preferred embodiment includes a computer-readable medium having computer-executable instructions stored thereon that cause a computer to perform a method of interpreting device control commands. This method has the basic process flow of receiving a high level device control command, generating a generic device control script based on a device interconnect model and the high level device control command, interpreting the generic device control script, and transmitting specific device control commands to a device through a device interface.

The multimedia systems described above are user friendly. Some advantages are: (1) to support consistency in the user interface by hiding specific device control command information from the user; (2) to facilitate a non-intimidating user interface using terms familiar to a user with no prior experience with the technology, and to facilitate a user interface adapted to suit the needs and abilities of the user; and (3) to facilitate a user interface that manipulates objects with direct analogues to the user's environment rather than internal system objects the user need not know about.

This description has shown how the user may give high level commands, independent of the complex internal subsystem details, which are then interpreted or refined incrementally by the present invention into the specific commands, containing the complex internal subsystem details, necessary to make the multimedia system control its multimedia devices.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A method of interpreting device control commands, comprising:
   receiving a high level device control command;
   generating a generic device control script based on a device interconnect model and the high level device control command;
   interpreting the generic device control script;
   transmitting specific device control commands to a device through a device interface;
   providing at least one vendor-specific command database;
   wherein the generic device control script is partially interpreted by selecting at least one vendor specific command from the database; and
   transmitting specific vendor specific commands.

2. The method of claim 1, and further comprising:
   providing at least one 1394 command database;
   wherein the generic device control script is partially interpreted by selecting at least one 1394 command from the database; and
   transmitting specific 1394 commands.

3. The method of claim 1 wherein the high level device control command is received from a user.

4. The method of claim 1, and further comprising:
   providing at least one interface command database;
   selecting at least one interface command based on the properties of the device to be controlled; and
   executing the interface commands.

5. The method of claim 1 wherein the specific device control commands are transmitted on an infrared transmitter.

6. The method of claim 1 wherein the specific device control commands are transmitted on a 1394 driver.

7. The method of claim 1 wherein the specific device control commands are transmitted on one or more of an infrared transmitter, a 1394 driver, and other drivers and interfaces.

8. A method of interpreting device control commands, comprising:
   receiving a high level device control command;
   generating a generic device control script based on a device interconnect model and the high level device control command;
   interpreting the generic device control script; and
   transmitting specific device control commands to a device through a device interface;
   providing a plurality of databases including an infrared command database, a 1394 command database, a vendor-specific command database, a device, manufacturer model, and interface database, and other command data; and
   wherein the generic device control script is interpreted by accessing at least one of the plurality of databases and creating specific device control commands.

9. A method of interpreting device control commands, comprising:
   receiving a high level device control command;
   generating a generic device control script based on a device interconnect model and the high level device control command;
   interpreting the generic device control script; and
   transmitting specific device control commands to a device through a device interface;
   providing at least one infrared command database;

wherein the generic device control script is partially interpreted by selecting at least one infrared command from the database; and transmitting specific infrared commands.

10. A method of interpreting device control commands, comprising;

receiving a high level device control command;

generating a generic device control script based on a device interconnect model and the high level device control command;

interpreting the generic device control script; and transmitting specific device control commands to a device through a device interface;

providing at least one device, manufacturer, model, and interface database;

wherein the generic device control script is partially interpreted by selecting at least one command database based on the properties of the device; and transmitting specific commands.

11. A method of processing device control commands in a system of multimedia devices, comprising:

receiving a high level device control command comprising one of a user request and a system generated command for controlling a multimedia device of the system;

generating a generic device control script comprising a plurality of control commands not tailored for a specific multimedia device of the system based on a comparison of (i) a device interconnect model of the multimedia devices of the system and system connections between the multimedia devices and (ii) the high level device control command;

interpreting the generic device control script so as to tailor the script for a specific multimedia device; and transmitting specific device control commands to the specific multimedia device through a device interface.

12. A multimedia system comprising:

an information handling system comprising a memory device;

a plurality of multimedia devices in communication with said information handling system;

at least one first software module residing in said memory device, the first software module comprising a plurality of databases including an infrared command database, a 1394 command database, a vendor specific command database, a device, manufacturer, model, and interface database and other command data; and at least one second software module residing in said memory device, the second software module comprising a set of machine-readable instructions performing a method of interpreting device control commands, comprising;

receiving a high level device control command;

generating a generic device control script based on a device interconnect model and the high level device control command;

interpreting the generic device control script; and transmitting specific device control commands to a device through a device interface.

13. The system of claim 12 wherein the method further comprises the high level device control command being generated by the multimedia system.

14. A computer-readable medium having stored thereon computer-executable instructions when executed, causes a computer to perform a method of interpreting device control commands, the method comprising:

receiving a high level device control command;

generating a generic device control script based on a device interconnect model and the high level device control command;

interpreting the generic device control script;

transmitting specific device control commands to a device through a device interface;

providing at least one vendor-specific command database;

wherein the generic device control script is partially interpreted by selecting at least one vendor specific command from the database; and transmitting specific vendor specific commands.

15. The computer-readable medium of claim 14, wherein the method further comprises:

providing at least one 1394 command database;

wherein the generic device control script is partially interpreted by selecting at least one 1394 command from the database; and transmitting specific 1394 commands.

16. The computer-readable medium of claim 14, wherein the method further comprises:

providing at least one interface command database;

selecting at least one interface command based on the properties of the device to be controlled; and executing the interface commands.

17. The computer-readable medium of claim 14 wherein the specific device control commands are transmitted on an infrared transmitter.

18. The computer-readable medium of claim 14 wherein the specific device control commands are transmitted on a 1394 driver.

19. The computer-readable medium of claim 14 wherein the specific device control commands are transmitted on one or more of: an infrared transmitter, a 1394 driver, and other drivers and interfaces.

20. A computer-readable medium having stored thereon computer-executable instructions when executed, causes a computer to perform a method of interpreting device control commands, the method comprising:

receiving a high level device control command;

generating a generic device control script based on a device interconnect model and the high level device control command;

interpreting the generic device control script;

transmitting specific device control commands to a device through a device interface;

providing a plurality of databases including an infrared command database, a 1394 command database, a vendor-specific command database, a device, manufacturer, model, and interface database, and other command data; and wherein the generic device control script is interpreted by accessing at least one of the plurality of databases and creating specific device control commands.

21. A computer-readable medium having stored thereon computer-executable instructions when executed, causes a computer to perform a method of interpreting device control commands, the method comprising:

receiving a high level device control command;

generating a generic device control script based on a device interconnect model and the high level device control command;

interpreting the generic device control script;

transmitting specific device control commands to a device through a device interface;

providing at least one infrared command database;

wherein the generic device control script is partially interpreted by selecting at least one infrared command from the database; and transmitting specific infrared commands.

22. A computer-readable medium having stored thereon computer-executable instructions when executed, causes a computer to perform a method of interpreting device control commands, the method comprising:

receiving a high level device control command;

generating a generic device control script based on a device interconnect model and the high level device control command;

interpreting the generic device control script;

transmitting specific device control commands to a device through a device interface;

providing at least one device, manufacturer, model, and interface database;

wherein the generic device control script is partially interpreted by selecting at least one command database based on the properties of the device; and transmitting specific commands.

23. A computer-readable medium having stored thereon computer-executable instructions when executed, causes a computer to perform a method of interpreting device control commands, the method comprising;

receiving a high level device control command;

generating a generic device control script based on a device interconnect model and the high level device control command;

interpreting the generic device control script;

transmitting specific device control commands to a device through a device interface;

providing a plurality of databases including an infrared command database, a 1394 command database, a vendor specific command database, a device, manufacturer, model, and interface database and other command data; and wherein the generic device control script is interpreted for a device that is not an exact match in at least one of the plurality of databases by creating specific device control commands for a similar device.

24. A computer-readable medium having stored thereon computer-executable instructions when executed, causes a computer to perform a method of interpreting device control commands, the method comprising:

receiving a high level device control command;

generating a generic device control script based on a device interconnect model and the high level device control command;

interpreting the generic device control script;

transmitting specific device control commands to a device through a device interface;

providing a plurality of databases including an infrared command database, a 1394 command database, a vendor specific command database, a device, manufacturer, model, and interface database and other command data; and wherein the generic device control script is interpreted for a device that is not in at least one of the plurality of databases by creating specific device control commands for a generic device.

25. A computer-readable medium having stored thereon computer executable instructions for performing a method of interpreting device control commands, the method comprising:

providing at least one device interconnect model;

providing a plurality of databases including an infrared command database, a 1394 command database, a vendor specific command database, a device, manufacturer, model, and interface database and other command data;

receiving a high level device control command;

generating a generic device control script based on one or more device interconnect models and the high level device control command;

accessing one or more of the plurality of databases to interpret the generic device control script;

interpreting the generic device control script to create specific device control commands;

creating specific device control commands for the device when the device is in at least one of the plurality of databases, for a similar device when the device is not in at least one of the plurality of databases, or for a generic device when no similar device is in at least one of the plurality of databases; and transmitting specific device control commands on an infrared transmitter, a 1394 driver or other driven and interfaces.

* * * * *